UNITED STATES PATENT OFFICE.

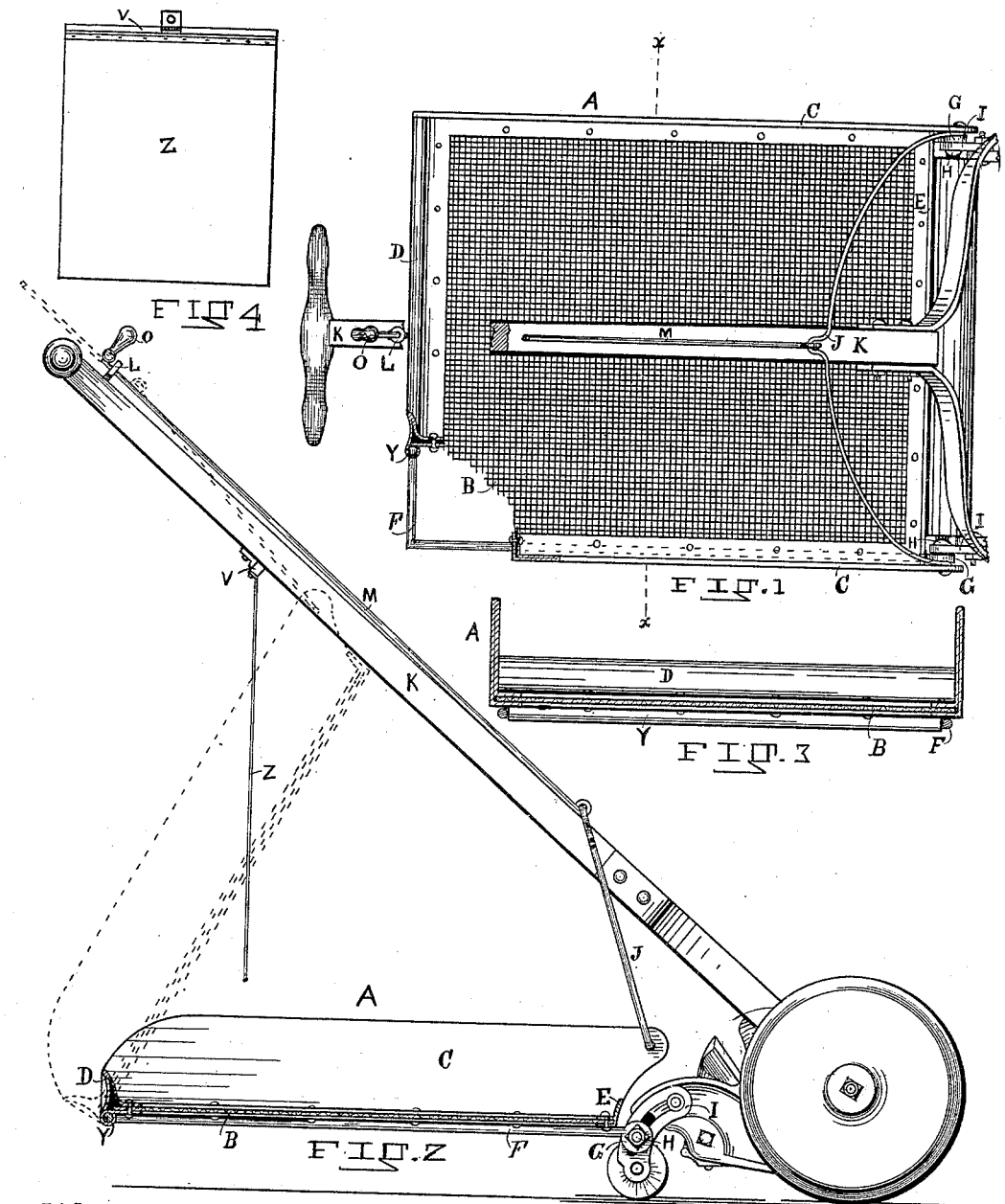

LE ROY SUTTON, OF DUNDEE, NEW YORK, ASSIGNOR OF ONE-HALF TO CLAYTON BIGELOW, OF SAME PLACE.

GRASS-GATHERING TRAY FOR LAWN-MOWERS.

SPECIFICATION forming part of Letters Patent No. 440,518, dated November 11, 1890.

Application filed May 27, 1890. Serial No. 353,352. (No model.)

*To all whom it may concern:*

Be it known that I, LE ROY SUTTON, a citizen of the United States, residing at Dundee, in the county of Yates and State of New York, have invented certain new and useful Improvements in Grass-Gathering Trays for Lawn-Mowers, of which the following is a specification.

My invention relates to improvements in grass-gathering trays, applicable for attachment to different kinds of lawn-mowing machines, and has for its object to catch the grass as it is cut off, with other features of improvements resultant therein, more fully described hereinafter, and pointed out in the claims.

Figure 1 is a plan view of my tray with one corner of its upper structure broken away from its supporting rod or frame and parts of a mower in connection. Fig. 2 is a longitudinally-vertical section of same, except the mowing-machine, which is shown in full. Fig. 3 is a cross-section on the line $x$ $x$, Fig. 1. Fig. 4 is a side view of curtain detached from mower-handle.

Like letters refer to like parts throughout the description and views.

A designates the frame of the gathering tray or receptacle, which comprises a bottom secured to the lower edges of the said frame, formed of wire screen or sieve B or equivalent material, and thus forming the tray, the side walls C rising upward, so as to be arranged at an angle to the bottom and of sufficient height to retain the grass from front to rear, and a rearwardly-inclined rear wall D and a front wall E, both of lesser height, and which join the side walls C. The general shape or contour is substantially rectangular. I prefer the wire sieve or screen for bottoming the tray, because it is light and measurably prevents the grass from sliding thereon as the machine is driven up or down an incline.

Beneath the rear wall D and side walls C of the tray, and of like contour, is the rod F, terminating forward of the tray in eyes G, through which bolts H pass and by which said rod F may have hinged or rigid attachment to the slotted roller-arms I of most all mowers; but as some mowers do not have these rearwardly-extending arms $i$, I do not wish in such cases to confine myself to any particular style of its attachment.

The tray at its rear end is pivoted to the rod F by a hinge Y, encircling that portion of the rod beneath its rear wall D, and receives its whole support from said rod.

The bail J, securely hooked to the side walls C near their forward ends, passes over the handle K of the mower, but in such inclined manner as not to interfere with perfect freedom in the rise or fall of said handle, which is thus relieved of any weight of the tray.

Retained in the eye L, which is removably inserted in the upper end of the handle, is the sliding pitman-rod M, connecting with said bail at its lower end and formed into a convenient handle O at its upper end for the operator, who may at any time, through medium of the pitman and bail, lift the tray to an upright position, as shown by dotted lines in Fig. 2, and dump its contents.

Z represents a curtain of linen or other suitable material, of width corresponding to that of the tray, its upper edge secured to the bar V, from which it hangs suspended to stop the grass from being thrown over the tray by the knives of the mower when driven at high speed.

The bar V is secured transversely to the mower-handle in any convenient manner for the curtain to fall near the rear of the tray, as shown in Fig. 3.

Having thus fully described my improvements, what I claim and wish to secure by Letters Patent, is—

1. In combination with a lawn-mower, the independent supporting-rod F for the tray of one piece, conforming with the outline of the tray from the front, where it terminates in eyes G G, the tray A, having a screen-bottom and supported by said rod and hinged thereto beneath its rear wall D, the side walls C of the tray having a bail and a lifting-pitman connected to the bail, substantially as described.

2. A grass-catching tray A, hinged at its rear end to a supporting or floating rod, said rod having connection with the mower only at its front, the tray having a screen-bottom, and side walls C C, connected together at their front by a lifting-bail, said bail connected to a lifting-pitman on the mower-handle, substantially as described.

3. In a mower, in combination, the grass-gathering tray A, having the rear wall D and the hinge Y, connecting said wall and the crossing portion of the U-shaped tray, supporting-rod F beneath it, the bail J, connecting the forward end of the tray, and the rearwardly-inclined pitman on the mower-handle, substantially as described.

4. The bar V, having the curtain Z hanging therefrom, in combination with the tray A and handle K of the mower, substantially as described.

5. In a grass-gathering tray, the downward extension of the rear wall D to form the hinge Y of the tray, in combination with the U-shaped supporting-rod F and the arms I of the mower, substantially as described.

LE ROY SUTTON.

Witnesses:
  E. HORTON,
  C. J. BIGELOW.